US011807806B2

(12) United States Patent
Patil et al.

(10) Patent No.: US 11,807,806 B2
(45) Date of Patent: *Nov. 7, 2023

(54) COMBINATION OF FLUID LOSS CONTROL ADDITIVE AND LOST CIRCULATION MATERIALS TO CONTROL LOSSES IN FORMATION

(71) Applicant: Halliburton Energy Services, Inc., Houston, TX (US)

(72) Inventors: Sandip Prabhakar Patil, Pune (IN); Samuel Jason Lewis, The Woodlands, TX (US); Kyriacos Agapiou, Houston, TX (US); Ganesh Shriniwas Pangu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,773

(22) Filed: Dec. 8, 2021

(65) Prior Publication Data

US 2022/0098467 A1  Mar. 31, 2022

Related U.S. Application Data

(62) Division of application No. 16/583,203, filed on Sep. 25, 2019, now Pat. No. 11,225,596.

(51) Int. Cl.
*E21B 43/12* (2006.01)
*C09K 8/487* (2006.01)
(Continued)

(52) U.S. Cl.
CPC ............ *C09K 8/487* (2013.01); *C04B 18/162* (2013.01); *C04B 28/021* (2013.01); *C09K 8/03* (2013.01); *E21B 43/13* (2020.05); *C09K 2208/08* (2013.01)

(58) Field of Classification Search
CPC ...... C09K 8/487; C09K 8/03; C09K 2208/08; E21B 43/13; C04B 18/162; C04B 2/021
See application file for complete search history.

(56) References Cited

U.S. PATENT DOCUMENTS 5,127,473 A * 7/1992 Harris .................. C09K 8/428
166/292
5,207,282 A   5/1993 Fuh et al.
(Continued)

FOREIGN PATENT DOCUMENTS

| WO | 2009106796 | 9/2009 |
| WO | 2014022292 | 2/2014 |
| WO | 2019125431 | 6/2019 |

OTHER PUBLICATIONS

Halliburton, Cementing, Brochure / Product sheet for HALAD-567, H01502, Jul. 2006.
(Continued)

*Primary Examiner* — Silvana C Runyan
(74) *Attorney, Agent, or Firm* — Thomas Rooney; C. Tumey Law Group PLLC

(57) ABSTRACT

Provided are methods, compositions, and systems embodying cement compositions and the synergistic effect of lost circulation materials (LCMs) and fluid loss control additives (FLCAs) thereupon for cementing subterranean zones. A method of subterranean well cementing, comprising providing a cement composition comprising a hydraulic cement, a first FLCA, a LCM, and water, wherein the first FLCA comprises a water-soluble polymer with repeating units comprising a 5- to 6-membered cyclic amide; introducing the cement composition into a wellbore penetrating a subterranean formation, wherein inclusion of the first FLCA and the LCM in the cement composition fluid reduces fluid loss into the subterranean formation, wherein the subterranean formation has fractures with a width of from about 1 micron
(Continued)

to about 800 microns, and wherein the subterranean formation has a permeability of about 1 millidarcy to about 300 Darcy; and allowing the cement composition to set in the subterranean formation.

18 Claims, 3 Drawing Sheets

(51) Int. Cl.
  *C04B 18/162* (2023.01)
  *C09K 8/03* (2006.01)
  *C04B 28/02* (2006.01)

(56) References Cited

U.S. PATENT DOCUMENTS

| | | | |
|---|---|---|---|
| 5,529,123 A | 6/1996 | Carpenter et al. | |
| 5,988,279 A | 11/1999 | Udarbe et al. | |
| 6,085,840 A * | 7/2000 | Laramay | C04B 24/2652 |
| | | | 106/725 |
| 6,138,759 A * | 10/2000 | Chatterji | C04B 28/021 |
| | | | 166/291 |
| 6,666,268 B2 * | 12/2003 | Griffith | C09K 8/502 |
| | | | 166/292 |
| 7,055,603 B2 | 6/2006 | Caveny et al. | |
| 7,213,646 B2 | 5/2007 | Roddy et al. | |
| 2005/0061505 A1 | 3/2005 | Caveny et al. | |
| 2005/0204961 A1 | 9/2005 | Chatterji et al. | |
| 2006/0096759 A1 * | 5/2006 | Reddy | C09K 8/516 |
| | | | 166/295 |
| 2007/0244013 A1 | 10/2007 | Hoskins | |
| 2009/0008095 A1 | 1/2009 | Duncum et al. | |
| 2010/0181073 A1 | 7/2010 | Dupriest et al. | |
| 2015/0166870 A1 | 6/2015 | Jain | |
| 2015/0292278 A1 | 10/2015 | Wang | |
| 2016/0096988 A1 | 4/2016 | Lin et al. | |

OTHER PUBLICATIONS

Halliburton, Cementing, Brochure / Product sheet for HALAD-413, H01332, Aug. 2007.
Halliburton, Cementing, Brochure / Product sheet for SA-1015, Suspending Agent, H09094, Mar. 2012.
Halliburton, Brochure / Product sheet for Barashield-663, Lost Circulation Material, 2017.
International Search Report and Written Opinion for Appliction No. PCT/US2019/053856 dated Jun. 19, 2020.
Office Action Summary fo U.S. Appl. No. 16/583,203 dated Dec. 14, 2020.
Final Office Action Summary for U.S. Appl. NO. 16/583,203 dated Mar. 19, 2021.
Office Action Summary for U.S. Appl. NO. 16/583,203, dated Jun. 3, 2021.

* cited by examiner

COMBINATION OF FLUID LOSS CONTROL ADDITIVE AND LOST CIRCULATION MATERIALS TO CONTROL LOSSES IN FORMATION

BACKGROUND

Subterranean zones penetrated by drilling wellbores are commonly sealed by cement compositions. For example, cement compositions are used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore, or a larger conduit in the wellbore. The cement composition may set in the annular space, thereby forming a cement sheath. Generally, a cement sheath is an annular sheath of hardened, substantially impermeable material that may support and position the pipe string in the wellbore and may bond the exterior surface of the pipe string to the wellbore walls, or the larger conduit. Among other things, the cement sheath surrounding the pipe string should function to prevent the migration of drilling fluids in the annulus, as well as protecting the pipe string from corrosion. Cement compositions may also be utilized in a variety of cementing operations, such as sealing highly permeable zones or fractures in subterranean zones, plugging cracks or holes in pipe strings, and the like.

Subterranean formations traversed by well bores often may be weak, highly permeable, and extensively fractured. In some cases, such formations may be unable to withstand the hydrostatic pressure normally associated with fluids (e.g., cement compositions and the like) being injected into the formation. In such cases, the hydrostatic pressure may be sufficient to force such fluids into the natural or created fractures and/or permeable zones of the formation, which may result in a significant loss of fluid into the formation. This loss of fluid circulation may be problematic for a number of reasons. For example, where the loss of circulation occurs during a cementing operation, excessive fluid loss may cause a cement composition to dehydrate prematurely. Premature dehydration of the cement composition may excessively viscosify the cement composition, and potentially may cause an operator to terminate the cementing operation, wash out the cement composition from the well bore, and restart the cementing operation anew.

Previous attempts to minimize the loss of circulation into the subterranean formation have involved adding a variety of additives, including, but not limited to, asphaltenes, ground coal, cellulosic materials, plastic materials, walnut hulls, plastic laminates (Formica® laminate), and the like, to the cement composition. Fluid loss additives may also be included in cement composition to combat fluid loss into the formation. While attempts have been made previously to address problems with loss of fluid into the formation, these materials may not adequately address problems with loss of fluid, for example, due to varied fracture sizes or permeability that can be encountered downhole. For instance, existing attempts for controlling loss of fluid may only be effective at addressing loss of fluid into certain fracture sizes.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
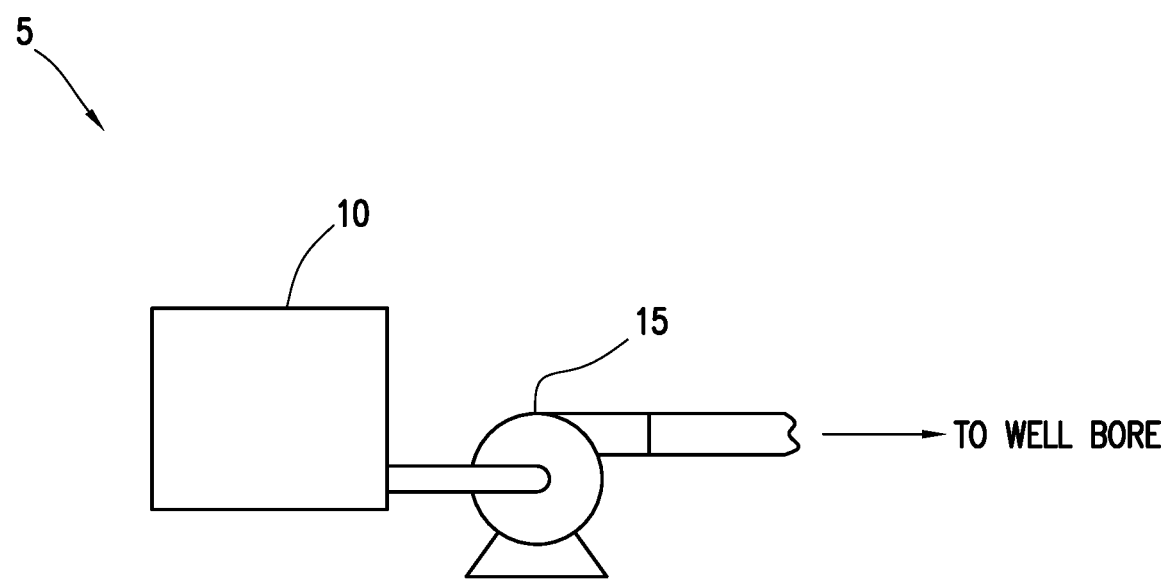
FIG. 1 is a schematic illustration of an example system for the preparation and delivery of a cement composition to a wellbore.

The present disclosure provides methods, compositions, and systems embodying cement compositions and the synergistic effect of lost circulation materials (LCMs) and fluid loss control additives (FLCAs) thereupon for cementing subterranean zones.

The cement compositions may include a hydraulic cement, LCMs, a first FLCA (FLCA-1), and water. Optionally, a second FLCA (FLCA-2) may be included in the cement compositions. The cement composition results in the synergistic effect of LCMs and FLCAs to improve the capability of a cement composition's ability to plug a subterranean formation with varying fracture widths, for example, having widths from about 1 micron to about 800 microns and permeability of from about 1 milliDarcy (mD) to about 300 Darcy. Alternatively, the subterranean formation may have fracture widths varying from about 1 micron to about 800 microns, about 20 microns to about 700 microns, about 50 microns to about 600 microns, about 100 microns to about 500 microns, or about 200 microns to about 400 microns. Moreover, alternatively, the subterranean formation may have a permeability of from about 1 mD to about 300 Darcy, about 1 Darcy to about 250 Darcy, about 50 Darcy to about 200 Darcy, or about 100 Darcy to about 150 Darcy. Currently used LCMs may be effective for use in curing fractures, whereas, they have not shown to be effective for use in plugging a permeable formation. However, the composition disclosed herein may be used to effectively cure fractures and plug the permeable formation. In the permeable formation, the particles and compositions disclosed herein form a layer within the permeable zone, then the interstitial space between the particles of the disclosed composition may be plugged by the disclosed FLCAs.

Any of a variety of hydraulic cements may be suitable for the disclosed composition, including those including calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, alumina-based cements, silica cements, and any combination thereof. Examples of suitable Portland cements may include those classified as Classes A, B, C, G, or H cements according to American Petroleum Institute, API Specification for Materials and Testing for Well Cements, API Specification 10, Fifth Ed., Jul. 1, 1990. Additional examples of suitable Portland cements may include those classified as ASTM Type I, II, III, IV, or V.

The hydraulic cement may be included in the cement composition in any suitable amount as desired for a particular application. The concentration of the hydraulic cement may be selected, for example, to provide a particular compressive strength for the cement composition after setting. Where used, the hydraulic cement may be included in an amount of about 1% to about 80% by weight of the cement composition. Alternatively, the hydraulic cement may be present in an amount of about 1% to about 80% by weight of the cement composition, about 5% to about 75% by weight of the cement composition, about 10% to about 70% by weight of the cement composition, about 20% to about 60% by weight of the cement composition, or about 30% to about 50% by weight of the cement composition. One of ordinary skill in the art, with the benefit of this disclosure, should recognize the appropriate amount of the hydraulic cement to include for a chosen application.

A wide variety of LCMs may be used in the example cement compositions disclosed herein. For example, suitable LCMs may include, but are not limited to, petroleum coke, graphite, walnut hulls, cedar bark, shredded cane stalks, mineral fiber, mica flakes, cellophane, calcium carbonate, ground rubber, polymeric materials, pieces of plastic, grounded marble, asphaltenes, ground coal, wood, nut hulls, plastic laminates (Formica® laminate), corncobs, cotton hulls, and combinations thereof. In an example, a suitable LCM includes petroleum coke, graphite, walnut hulls, and graphite. The LCMs may be blended with the hydraulic cement prior to combination of the dry blend with the water fluid to form the cement composition or the LCMs may be added separately to the cement composition.

The LCMs may be present in the treatment fluid in any suitable amount, including, but not limited to, an amount of about 0.1% to about 10% by weight of the cement composition. Alternatively, the LCMs may be present in an amount of about 0.1% to about 10% by weight of the cement composition, about 2% to about 9% by weight of the cement composition, about 3% to about 8% by weight of the cement composition, about 4% to about 7% by weight of the cement composition, or about 5% to about 6% by weight of the cement composition. One of ordinary skill in the art, with the benefit of this disclosure, should recognize the appropriate amount of the LCMs to include for a chosen application.

The particle size of the LCMs may be selected to synergistically function with the FLCAs in reducing loss of fluid into the formation. For example, selection of the particle size of the LCM can enable the combination with the FLCAs to function over a wider range of fracture sizes. The LCMs may have a multimodal particle size distribution ("PSD"). As referenced herein, the PSD of a powder, or granular material or particles dispersed in fluid, is a list of values or a mathematical function that defines the relative amount, typically by mass, of particles present according to size. Generally, PSD may be defined by the method by which it is determined. A commonly used method of determination is sieve analysis, wherein particles are separated on sieves of different sizes. Sieve analysis presents particle size information in the form of an S-curve of cumulative mass retained on each sieve versus the sieve mesh size. Thus, the PSD may be defined in terms of discrete size ranges. The PSD may be determined over a list of size ranges that cover nearly all the sizes present in a particular sample. Some methods of determination allow much narrower size ranges to be defined than can be obtained by use of sieves, and may be applicable to particle sizes outside of the range available in sieves.

Moreover, as further disclosed herein, commonly used metrics for describing PSD are D-Values (D10, D50 & D90) which are the intercepts for 10%, 50% and 90% of the cumulative mass. For example, the D10 is the diameter at which 10% of the sample's mass is particles with a diameter less than this value. The D50 is the diameter of the particle that 50% of a sample's mass is particles with a diameter less than this value. The D90 is the diameter at which 90% of the sample's mass is particles with a diameter less than this value.

Further, the PSD may be expressed as a "range" analysis, in which the amount in each size range may be listed in order. For example, the LCMs may have a PSD of about 2 microns to about 570 microns. Alternatively, the LCMs may have a PSD of about 2 microns to about 570 microns, about 20 microns to about 500 microns, about 30 microns to about 400 microns, about 40 microns to about 300 microns, about 50 microns to about 200 microns, or about 100 microns to about 150 microns.

By way of analysis, the multimodal particle size distribution results in multiple modal peaks. Generally, a multimodal distribution may be a continuous probability distribution with two or more modes. For example, the LCMs may have from about 2 up to about 20 or more modal peaks. Alternatively, the LCMs may have from about 2 to about 20 or more modal peaks, from about 4 to about 18 or more modal peaks, from about 6 to about 16 or more modal peaks, from about 8 to about 14 or more modal peaks, or from about 10 to about 12 or more modal peaks. Modal peaks occur on a particle size distribution curve when there are increased particle concentrations relative to particle sizes on either side of the curve. One of ordinary skill in the art, with the benefit of this disclosure, should be able to select an appropriate particle size for the LCMs for a particular application.

The FLCAs included in the cement composition may include a first FLCA (FLCA-1). The FLCA-1 may be a water-soluble polymer with repeating units that include a 5 to 6 membered cyclic amide. The FLCA-1 may be selected from, but not limited to, a group including a polyacryloylmorpholine polymer, a polyvinylpyrrolidone polymer, and combinations thereof. For example, the polymer component of the FLCA-1 may be selected from the group including a polyacryloylmorpholine copolymer, a polyvinylpyrrolidone copolymer, and combinations thereof. For example, the polyacryloylmorpholine copolymer may be selected from a group including an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, a 2-acrylamido-2-methylpropane sulfonic acid and acryloylmorpholine copolymer, and combinations thereof. For example, the polyacryloylmorpholine copolymer may be a 2-acrylamido-2-methylpropane sulfonic acid and acryloylmorpholine copolymer, and combinations thereof. For example, the polyvinylpyrrolidone copolymer may be selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, a 2-acrylamido-2-methylpropane sulfonic acid and vinylpyrrolidone copolymer, and combinations thereof. For example, the polyvinylpyrrolidone copolymer may be a 2-acrylamido-2-methylpropane sulfonic acid and vinylpyrrolidone copolymer.

The FLCA-1 may be present in the cement composition in any suitable amount, including, but not limited to, an amount of about 0.05% to about 5% by weight of the cement composition. For example, the FLCA-1 may be present in an amount of about 0.05% to about 3% by weight of the cement composition, about 0.1% to about 1% by weight of the cement composition, or about 0.1% to about 0.5% by weight of the cement composition. One of ordinary skill in the art, with the benefit of this disclosure, should be able to select an appropriate concentration of the FLCA-1 for a particular application.

The FLCAs included in the cement composition may include a second FLCA (FLCA-2). The FLCA-2 may be a water-soluble polymer component including, but not limited to, a dimethyl group, a sulfomethyl group, a sulfonate group, and combinations thereof. The FLCA-2 may be selected from, but not limited to, the group that includes a graft polymer of 2-acrylamido-2-methylpropane sulfonic acid and acrylamide. The FLCA-2 may further be selected from, but not limited to, the group that includes polyacrylamide polymers and copolymers, copolymers of 2-Acrylamido-2-methylpropane sulfonic acid and dimethylacrylamide (DMA), polymers of acrylonitrile, isobutylene, acrylamide and 2-acrylamido-2-methylpropane sulfonic acid monomers grafted on lignite, acryloylmorpholine and vinylphosphonic acid copolymers, humic acid grafted polymers, and polymers of polyvinyl alcohol and boric acid, and combinations thereof.

The FLCA-2 may be present in the cement composition in any suitable amount, including, but not limited to, an amount of about 0.05% to about 5% by weight of the cement composition. For example, the FLCA-2 may be present in an amount of about 0.05% to about 3% by weight of the cement composition, about 0.1% to about 1% by weight of the cement composition, or about 0.1% to about 0.5% by weight of the cement composition. One of ordinary skill in the art, with the benefit of this disclosure, should be able to select an appropriate concentration of the FLCA-2 for a particular application.

The water may be from any source provided that it does not contain an excess of compounds that may undesirably affect other components in the cement compositions. For example, a cement composition may include fresh water, saltwater such as brine (e.g., saturated saltwater produced from subterranean formations) or seawater, or any combination thereof. Saltwater generally may include one or more dissolved salts therein and may be saturated or unsaturated as desired for a particular application. Seawater or brines may be suitable for use in some examples of the cement composition. Further, the water may be present in an amount sufficient to form a pumpable slurry.

Generally, the water may be added to the cement composition in any desired concentration, including about 10% to about 80% by weight of the cement composition. Alternatively, the water may be present in the cement composition in an amount of about 10% to about 80% by weight of the cement composition, about 20% to about 70% by weight of the cement composition, about 30% to about 60% by weight of the cement composition, or about 40% to about 50% by weight of the cement composition. One of ordinary skill in the art, with the benefit of this disclosure, should be able to select an appropriate amount of water to include in a cement composition.

In some embodiments, the cement composition may further include a lightweight additive. The lightweight additive may be included to reduce the density of examples of the cement composition. For example, the lightweight additive may be used to form a lightweight cement composition, for example, having a density of less than about 13 lb/gal (1558 kg/m$^3$). The lightweight additive typically may have a specific gravity of less than about 2.0. Examples of suitable lightweight additives may include, but are not limited to, sodium silicate, hollow microspheres, gilsonite, perlite, and combinations thereof. The lightweight additive may be present in an amount of about 0.1% to about 15% by weight of the cement composition. Alternatively, the lightweight additive may be present in an amount of about 0.1% to about 15% by weight of the cement composition, about 1% to about 15% by weight of the cement composition, or about 2% to about 8% by weight of the cement composition.

In some embodiments, the cement composition may be foamed and include water, a gas, and a foaming surfactant. Optionally, to provide a cement composition with a lower density and more stable foam, the foamed cement composition may further include a lightweight additive, for example. A base slurry may be prepared that may then be foamed to provide an even lower density. In some embodiments, the foamed cement composition may have a density of about 4 lb/gal (479 kg/m$^3$) to about 13 lb/gal (1558 kg/m$^3$, about 5 lb/gal (533 kg/m$^3$) to about 10 lb/gal (1198 kg/m$^3$), or about 7 lb/gal (839 kg/m$^3$) to about 9 lb/gal (1078 kg/m$^3$).

The gas used in embodiments of the foamed cement composition may be any suitable gas for foaming the cement composition, including, but not limited to, air, nitrogen, and combinations thereof. Generally, the gas should be present in examples of the foamed cement composition in an amount sufficient to form the desired foam. In certain embodiments, the gas may be present in an amount of about 5% to about 80% by volume of the cement composition fluid at atmospheric pressure. Alternatively, the gas may be present in an amount of about 5% to about 80% by volume, about 10% to about 70% by volume, about 20% to about 60% by volume, or about 30% to about 50% by volume.

The foaming surfactant may include any suitable surfactant that facilitates the formation of foam, including, but are not limited to: anionic, nonionic, amphoteric (including zwitterionic surfactants), cationic surfactant, or combinations thereof, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; $C_8$ to $C_{22}$ alkylethoxylate sulfates; and combinations thereof. Specific examples of suitable foaming surfactants include, but are not limited to: combinations of an ammonium salt of an alkyl ether sulfate, a cocoamidopropyl betaine surfactant, a cocoamidopropyl dimethylamine oxide surfactant, sodium chloride, and water; combinations of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; combinations of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant, combinations of an ammonium salt of an alkyl ether sulfate, and combinations thereof. Generally, the foaming surfactant may be present in the cement composition fluids in an amount sufficient to provide a suitable foam. In some embodiments, the foaming agent may be present in an amount of about 0.8% to about 5% by volume of the water.

The cement compositions may include a pozzolan such as fly ash, silica fume, metakaolin, volcanic glasses, other natural glasses or combinations thereof. An example of a suitable pozzolan may include fly ash. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof. The pozzolan generally may be included in the cement compositions in an amount desired for a particular application. In some examples, the pozzolan may be present in the cement composition in an amount of about 1% to about 60% by weight of the cement composition, about 5% to about 55% by weight of the cement composition, about 10% to about 50% by weight of the cement composition, about 15% to about 45% by weight of the cement composition, about 20% to about 40% by weight of the cement composition, or about 25% to about 35% by weight of the cement composition. One of ordinary skill in the art, with the benefit of this disclosure, should recognize the appropriate amount of the pozzolan to include for a chosen application.

The cement composition may include slag. Slag is generally a granulated, blast furnace by-product from the production of cast iron including the oxidized impurities found in iron ore. The slag may be included in examples of the cement compositions in an amount suitable for a particular application. The slag may be present in an amount of about 0.1% to about 40% by weight of the cement composition. Alternatively, the slag may be present in an amount of about 0.1% to about 40%, about 5% to about 35%, about 10% to about 30%, or about 15% to about 25% by weight of the cement composition. One of ordinary skill in the art, with the benefit of this disclosure, should recognize the appropriate amount of the slag to include for a chosen application.

The cement composition may further include shale in an amount sufficient, for example, to provide the desired compressive strength, density, and/or cost. A variety of shales are suitable, including, but not limited to, silicon, aluminum, calcium, and/or magnesium. Examples of suitable shales include vitrified shale and/or calcined shale. The shale may be included in examples of the cement compositions in an amount suitable for a particular application. The shale may be present in an amount of about 0.1% to about 40% by weight of the cement composition. Alternatively, the shale may be present in an amount of about 0.1% to about 40%, about 5% to about 35%, about 10% to about 30%, or about 15% to about 25% by weight of the cement composition. One of ordinary skill in the art, with the benefit of this disclosure, should recognize the appropriate amount of the shale to include for a chosen application.

Some examples of the cement compositions may include silica sources, such as crystalline silica and/or amorphous silica. Crystalline silica is a powder that may be included in examples of the cement compositions, for example, to prevent cement compressive strength retrogression. Amorphous silica is a powder that may be included in examples of the cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Examples including additional silica sources may utilize the additional silica source as needed to enhance compressive strength or set times.

The cement composition may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kin dust generally may include a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. The kiln dust may be included in examples of the cement compositions in an amount suitable for a particular application. In some embodiments, the kiln dust may be present in the cement composition in an amount of about 1% to about 60% by weight of the cement composition, about 5% to about 55%, about 10% to about 50%, about 15% to about 45%, about 20% to about 40%, or about 25% to about 35% by weight of the cement composition. One of ordinary skill in the art, with the benefit of this disclosure, should recognize the appropriate amount of the kiln dust to include for a chosen application.

The cement composition may further include a set retarder. The set retarder may include, but is not limited to, phosphonic acids, such as ethylenediamine tetra(methylene phosphonic acid), diethylenetriamine Penta(methylene phosphonic acid), lignosulfonates, such as sodium lignosulfonate, calcium lignosulfonate, salts such as stannous sulfate, lead acetate, monobasic calcium phosphate, organic acids, such as citric acid, tartaric acid, cellulose derivatives such as hydroxyl ethyl cellulose (HEC) and carboxymethyl hydroxyethyl cellulose (CMHEC), synthetic copolymers including sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or combinations thereof. Examples of suitable set retarders include, among others, phosphonic acid derivatives. Generally, the set retarder may be present in the cement compositions in an amount sufficient to delay the setting for a desired time. In some embodiments, the set retarder may be present in the cement compositions in an amount of about 0.01% to about 10% by weight of the cement composition, about 2% to about 8%, or about 4% to about 6% by weight of the cement composition. One of ordinary skill in the art, with the benefit of this disclosure, should recognize the appropriate amount of the set retarder to include for a chosen application.

The cement composition may include a set accelerator. Suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. The set accelerator may be included in examples of the cement compositions in an amount suitable for a particular application. In some embodiments, the set accelerator may be present in the cement compositions in an amount of about 0.01% to about 10% by weight of the cement composition, about 2% to about 8%, or about 4% to about 6% by weight of the cement composition. One of ordinary skill in the art, with the benefit of this disclosure, should recognize the appropriate amount of the set accelerator to include for a chosen application.

The cement composition may include a dispersant. Suitable dispersants include, but are not limited to, sulfonated-formaldehyde-based dispersants (e.g., sulfonated acetone formaldehyde condensate) and polycarboxylated ether dispersants. The dispersant may be included in examples of the cement compositions in an amount suitable for a particular application. In some embodiments, a dispersant may be included in the cement compositions in an amount of about 0.01% to about 5% by weight of the cement composition, about 1% to about 4%, or about 2% to about 3% by weight of the cement composition. One of ordinary skill in the art, with the benefit of this disclosure, should recognize the appropriate amount of the dispersant to include for a chosen application.

The cement composition may include a free water control additive. Suitable free water control additives include, but are not limited to, bentonite, amorphous silica, hydroxyethyl cellulose, and combinations thereof. The free water control additive may be provided as a dry solid in some embodiments. The free water control additive may be included in examples of the cement compositions in an amount suitable for a particular application. The free water control additive may be present in an amount of about 0.1% to about 16% by weight of dry solids, about 2% to about 14%, about 4% to about 12%, about 6% to about 10%, or about 7% to about 9% by weight of dry solids. One of ordinary skill in the art, with the benefit of this disclosure, should recognize the appropriate amount of the free water control additive to include for a chosen application.

Other additives suitable for use in subterranean cementing operations also may be included in embodiments of the cement compositions. Examples of such additives include, but are not limited to weighting agents, gas-generating additives, mechanical-property-enhancing additives, filtration-control additives, defoaming agents, thixotropic additives, and combinations thereof. In some embodiments, one or more of these additives may be dry blended with the hydraulic cement prior to blending with water. A specific example of an additional additive may include clay. A person having ordinary skill in the art, with the benefit of this disclosure, should readily be able to determine the type and amount of additive useful for a particular application and desired result.

The cement composition may have a density suitable for a particular application. By way of example, the cement composition may have a density of about 4 pounds per gallon ("lb/gal") (479 kg/m$^3$) to about 20 lb/gal (2396 kg/m$^3$). Alternatively, the cement composition may have a density of about 4 lb/gal (479 kg/m$^3$) to about 20 lb/gal (2396 kg/m$^3$), about 7 lb/gal (839 kg/m$^3$) to about 16 lb/gal (1917 kg/m$^3$), or about 10 lb/gal (1198 kg/m$^3$) to about 13 lb/gal (1558 kg/m$^3$). The density of cement may be an important design factor as the density range of cement may be limited by the formation properties. Embodiments of the set-delayed cement compositions may be foamed or unfoamed or may include other means to reduce their densities, such as lightweight additives. Those of ordinary skill in the art, with the benefit of this disclosure, should recognize the appropriate density for a particular application.

In some embodiments, the cement compositions may set to have a desirable compressive strength. Compressive strength is generally the capacity of a material or structure to withstand axially directed pushing forces. The compressive strength may be measured at a specified time after the cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a USA™ ultrasonic cement analyzer, available from Fann® Instrument Company, Houston, Tex. Compressive strength values may be determined in accordance with API RP 10B-2, *Recommended Practice for Testing Well Cements*, First Edition, July 2005. By way of example, the cement compositions may develop a 24-hour compressive strength in the range of from about 50 psi to about 5000 psi, alternatively, from about 100 psi to about 4500 psi, or alternatively from about 500 psi to about 4000 psi. In some examples, the cement compositions may develop a compressive strength in 24 hours of at least about 50 psi, at least about 100 psi, at least about 500 psi, or more. In some examples, the compressive strength values may be determined using destructive or non-destructive methods at a temperature ranging from 100° F. to 200° F.

The exemplary cement compositions disclosed herein may be used in a variety of subterranean operations, including primary and remedial cementing. The cement composition may be introduced into a wellbore and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, such as a subterranean formation, or into both. In primary cementing, the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing, a cement composition may be used, for example, in squeeze-cementing operations or in the placement of cement plugs. In some embodiments, the composition may be placed in a wellbore to plug an opening (e.g., a void or crack) in the formation, in a gravel pack, in the conduit, in the cement sheath, and/or between the cement sheath and the conduit (e.g., a microannulus).

The components of the cement composition may be combined in any order desired to form a cement composition that can be placed into a subterranean formation. In addition, the components of the cement compositions may be combined using any mixing device compatible with the composition, including a bulk mixer, for example. In some embodiments, the cement composition may be prepared by dry blending the solid components of the cement composition at a bulk plant, for example, and thereafter combining the dry blend with water when desired for use.

The systems, methods, and compositions may include any of the various features disclosed herein, including one or more of the following statements.

Statement 1. A method of subterranean well cementing may be disclosed. The method may include providing a cement composition including a hydraulic cement, a first fluid loss control additive, a lost circulation material, and water, wherein the first fluid loss control additive may include a water-soluble polymer with repeating units including a 5- to 6-membered cyclic amide. The method may further include introducing the cement composition into a wellbore penetrating a subterranean formation, wherein inclusion of the first fluid loss control additive and the lost circulation material in the cement composition reduces fluid loss into the subterranean formation, wherein the subterranean formation has fractures with a width of from about 1 micron to about 800 microns, and wherein the subterranean formation has a permeability of about 1 milliDarcy to about 300 Darcy. The method may further include allowing the cement composition to set in the subterranean formation.

Statement 2. The method of statement 1, wherein the water-soluble polymer of the first fluid loss control additive may include a polyacryloylmorpholine polymer.

Statement 3. The method of statement 1, wherein the water-soluble polymer of the first fluid loss control additive may include a polyvinylpyrrolidone polymer.

Statement 4. The method of statement 1, wherein the water-soluble polymer of the first fluid loss control additive may include a polyacryloylmorpholine copolymer selected from the group consisting of an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, and combinations thereof.

Statement 5. The method of statement 1, wherein the water-soluble polymer of the first fluid loss control additive may include a polyvinylpyrrolidone copolymer selected from the group consisting of an acrylic acid and vinylpyrrolidone copolymer, a methacrylic acid and vinylpyrrolidone copolymer, an acrylamide and vinylpyrrolidone copolymer, an N—N-dimethyl acrylamide and vinylpyrrolidone copolymer, and combinations thereof.

Statement 6. The method of any one of statements 1 to 5, wherein the lost circulation material has a particle size distribution of from about 2 microns to about 570 microns.

Statement 7. The method of any one of 1 to 6, wherein the cement composition further may include a second fluid loss control additive.

Statement 8. The method of statement 7, wherein the second fluid loss control additive may include a water-soluble polymer that includes a dimethyl group, a sulfomethyl group, a sulfonate group, and combinations thereof.

Statement 9. The method of claim 7, wherein the second fluid loss control additive includes a graft polymer of 2-acrylamido-2methylpropane sulfonic acid and acrylamide.

Statement 10. The method of any one of claims 1 to 9, wherein the lost circulation material may include petroleum coke, calcium carbonate, graphite, and walnut hulls.

Statement 11. The method of Statement 1, wherein the water-soluble polymer of the first fluid loss control additive may include a polyacryloylmorpholine polymer, wherein the lost circulation material may include petroleum coke, calcium carbonate, graphite, and walnut hulls, wherein the cement composition may include a second fluid loss control additive, and wherein the second fluid loss control additive may include a water-soluble polymer including at least one unit selected from the group consisting of a dimethyl group, a sulfomethyl group, a sulfonate group, and combinations thereof.

Statement 12. A method of subterranean well cementing may be disclosed. The method may include providing a cement composition that may include a hydraulic cement, a first fluid loss control additive, a second fluid loss control additive, a lost circulation material, and water, wherein the first fluid loss control additive may include a water-soluble polymer with repeating units including a 5- to 6-membered cyclic amide, wherein the second fluid loss control additive may include a water-soluble polymer including at least one unit selected from the group consisting of a dimethyl group, a sulfomethyl group, a sulfonate group, and combinations thereof, and wherein the lost circulation material has a particle size distribution of from about 2 microns to about 570 microns. The method may further include introducing the cement composition into an annular space surrounding a conduit positioned in a subterranean formation, wherein inclusion of the first fluid loss control additive, the second fluid loss control additive, and the lost circulation material in the cement composition reduces fluid loss into the subterranean formation, wherein the subterranean formation has fractures with a width of from about 1 micron to about 800 microns, and wherein the subterranean formation has a permeability of about 1 milliDarcy to about 300 Darcy. The method may further include allowing the cement composition to set in the annular space.

Statement 13. The method of statement 12, wherein the water-soluble polymer of the first fluid loss control additive may include a polyacryloylmorpholine polymer.

Statement 14. The method of statement 12, wherein the water-soluble polymer of the first fluid loss control additive may include a polyvinylpyrrolidone polymer.

Statement 15. The method of any one of statements 12 to 14, wherein the second fluid loss control additive is selected from the group consisting of polyacrylamide, an acrylamide copolymer, a copolymer of 2-acrylamido-2methylpropane sulfonic acid and dimethylacrylamide, acrylamide and 2-acrylamido-2methylpropane sulfonic acid monomers grafted on lignite, acryloylmorpholine and vinylphosphonic acid copolymers, and combinations thereof.

Statement 16. The method of any one of statements 12 to 15, wherein the lost circulation material has a particle size distribution of from about 30 microns to about 400 microns.

Statement 17. The method of any one of statements 12 to 16, wherein the lost circulation material may include petroleum coke, calcium carbonate, graphite, and walnut.

Statement 18. A cement composition may be disclosed. The cement composition may include a hydraulic cement. The cement composition may further include a first fluid loss additive that may include a water-soluble polymer with repeating units including a 5- to 6-membered cyclic amide. The cement composition may further include a second fluid loss control additive that may include a water-soluble polymer including at least one repeating unit selected from the group consisting of a dimethyl group, a sulfomethyl group, a sulfonate group, and combinations thereof. The cement composition may further include a lost circulation material having a particle size distribution of from about 2 microns to about 570 microns. The cement composition may further include water.

Statement 19. The cement composition of statement 18, wherein the hydraulic cement is selected from the group consisting of a Portland cement, a pozzolana cement, a gypsum cement, an alumina-based cement, a silica cements, and combinations thereof.

Statement 20. The cement composition of claim 18, wherein the water-soluble polymer of the first fluid loss control additive may include a polyvinylpyrrolidone copolymer selected from the group consisting of an acrylic acid and vinylpyrrolidone copolymer, a methacrylic acid and vinylpyrrolidone copolymer, an acrylamide and vinylpyrrolidone copolymer, an N—N-dimethyl acrylamide and vinylpyrrolidone copolymer, and combinations thereof.

Figure 2:
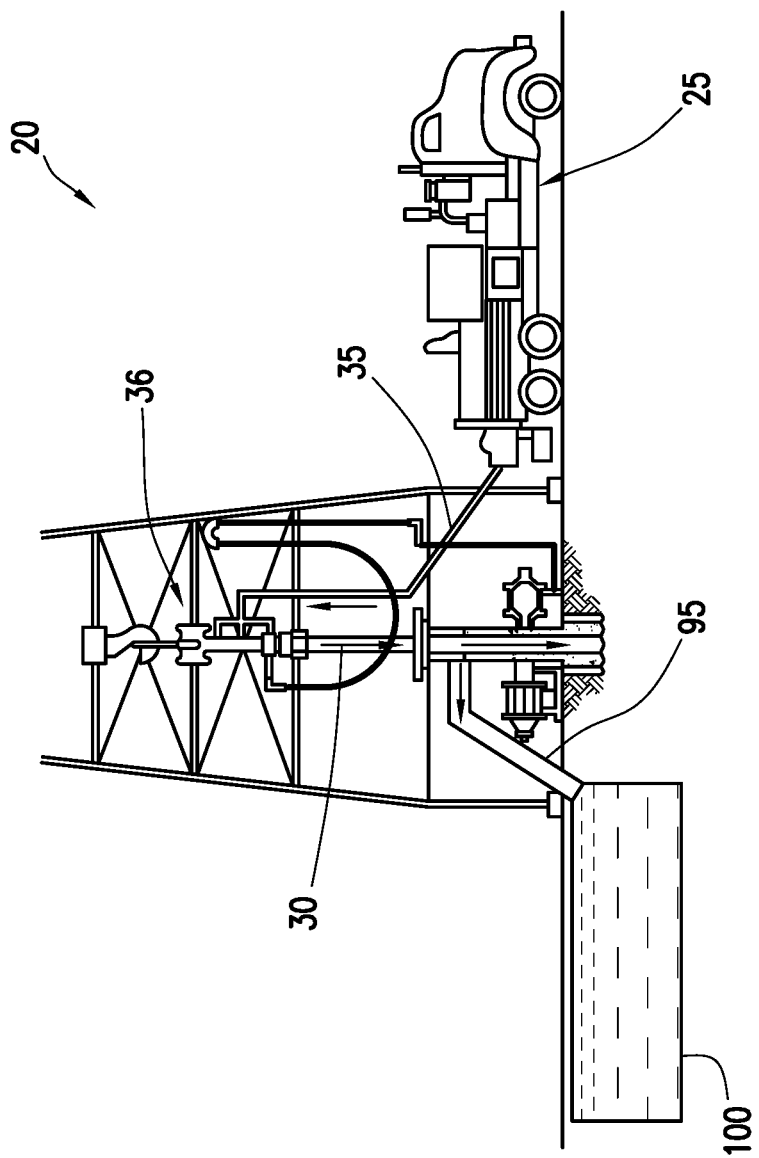
FIG. 2 is a schematic illustration of example surface equipment that may be used in the placement of a cement composition in a wellbore.

Example methods of using the LCMs and FLCAs in well cementing will now be described in more detail with reference to FIGS. 1-3. FIG. 1 illustrates an example system 5 for preparation of a cement composition including LCM and FLCAs and delivery of the cement composition to a wellbore. The cement composition may be any cement composition disclosed herein. As shown, the cement composition may be mixed in mixing equipment 10, such as a jet mixer, re-circulating mixer, or a batch mixer, for example, and then pumped via pumping equipment 15 to the wellbore. In some examples, the mixing equipment 10 and the pumping equipment 15 may be disposed on one or more cement trucks as will be apparent to those of ordinary skill in the art. In some examples, a jet mixer may be used, for example, to continuously mix a dry blend including the cement composition, for example, with the water as it is being pumped to the wellbore.

An example technique for placing a cement composition into a subterranean formation will now be described with reference to FIGS. 2 and 3. FIG. 2 illustrates example surface equipment 20 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement composition 30, which may include water and a cement composition including LCM and FLCAs, through a feed pipe 35 and to a cementing head 36 which conveys the cement composition 30 downhole.

Figure 3:
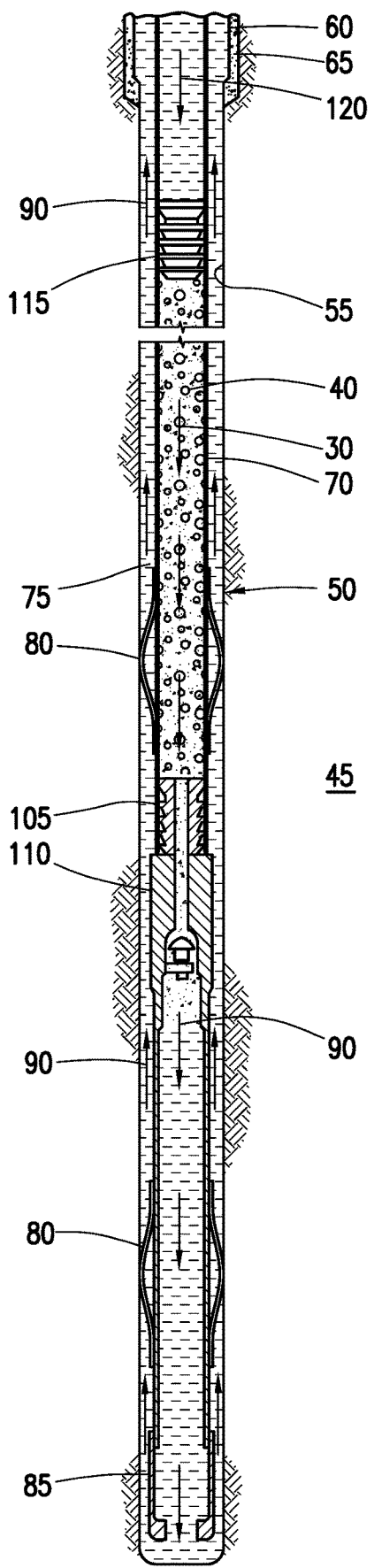
FIG. 3 is a schematic illustration of the example placement of a cement composition into a wellbore annulus.

Turning now to FIG. 3, the cement composition 30, including LCM and FLCAs, may be placed into a subterranean formation 45. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 includes walls 55. In the illustrated example, a surface casing 60 has been inserted into the wellbore 50. The surface casing 60 may be cemented to the walls 55 of the wellbore 50 by cement sheath 65. In the illustrated example, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement composition 30 may be pumped down the interior of the casing 70. The cement composition 30 may be allowed to flow down the interior of the casing 70 through the casing shoe 85 at the bottom of the casing 70 and up around the casing 70 into the wellbore annulus 75. The cement composition 30 may be allowed to set in the wellbore annulus 75, for example, to form a cement sheath that supports and positions the casing 70 in the wellbore 50. While not illustrated, other techniques may also be utilized for introduction of the cement composition 30. By way of example, reverse circulation techniques may be used that include introducing the cement composition 30 into the subterranean formation 45 by way of the wellbore annulus 75 instead of through the casing 70.

As it is introduced, the cement composition 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., a mud pit), as shown on FIG. 2. Referring again to FIG. 3, a bottom plug 105 may be introduced into the wellbore 50 ahead of the cement composition 30, for example, to separate the cement composition 30 from the other fluids 90 that may be inside the casing 70 prior to cementing. After the bottom plug 105 reaches the landing collar 110, a diaphragm or other suitable device should rupture to allow the cement composition 30 through the bottom plug 105. In FIG. 3, the bottom plug 105 is shown on the landing collar 110. In the illustrated example, a top plug 115 may be introduced into the wellbore 50 behind the cement composition 30. The top plug 115 may separate the cement composition 30 from a displacement fluid 120 and push the cement composition 30 through the bottom plug 105.

The exemplary cement compositions including LCM and FLCAs disclosed herein may directly or indirectly affect one or more components or pieces of equipment associated with the preparation, delivery, recapture, recycling, reuse, and/or disposal of the LCM and FLCAs and associated cement compositions. For example, the LCM and FLCAs may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cement compositions including LCM and FLCAs and fluids containing the same. The disclosed LCM and FLCAs may also directly or indirectly affect any transport or delivery equipment used to convey the LCM and FLCAs to a well site or downhole such as, for example, any transport vessels, conduits, pipelines, trucks, tubulars, and/or pipes used to compositionally move the LCM and FLCAs from one location to another, any pumps, compressors, or motors (e.g., topside or downhole) used to drive the LCM and FLCAs, or fluids containing the same, into motion, any valves or related joints used to regulate the pressure or flow rate of the LCM and FLCAs (or fluids containing the same), and any sensors (i.e., pressure and temperature), gauges, and/or combinations thereof, and the like. The disclosed LCMs and FLCAs may also directly or indirectly affect the various downhole equipment and tools that may come into contact with the LCMs and FLCAs such as, but not limited to, wellbore casings, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, terrorizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of some of the preferred examples are given. In no way should such examples be read to limit, or to define, the scope of the disclosure.

Example

Sample cement compositions were prepared and subjected to testing for rheology and fluid loss control. The test results for sample cement compositions having densities of 13 lb/gal (1558 kg/m$^3$) and 15 lb/gal (1797 kg/m$^3$) are shown in Table 1. The rheology testing was conducted using a Fann®-35 rheometer, in accordance with API-RP-10B2 testing standards. The fluid loss control testing was conducted using a 325-mesh (45-micron) screen and a 60-mesh (250-micron) screen, in accordance with API-RP-10B2 testing standards. The 500-micron slot testing was conducted on a Fann® Particle Plugging Apparatus ("PPA") and was performed in accordance with API-RP-13B1. The experiments on the screen are representative of a permeable formation, whereas the slot is representative of a fracture formation.

TABLE 1

|  | Expt. 1 | | Expt. 2 | | Expt. 3 | | Expt. 4 | |
| --- | --- | --- | --- | --- | --- | --- | --- | --- |
| Density of Cement slurry lb/gal (kg/m3) | 15 (1797) | | 15 (1797) | | 15 (1797) | | 13 (1558) | |
| Class H Cement (g) | 677.6 | | 677.6 | | 677.6 | | 453 | |
| FLCA-1 (g) | — | | — | | 1.9 | | 3.8 | |
| FLCA-2 (g) | 6.8 | | — | | 6.8 | | — | |
| Suspending Agent (g) | 0.4 | | 0.4 | | 0.4 | | 0.7 | |
| LCM (g) | — | | 17.5 | | 17.5 | | 34 | |
| Clay (g) | — | | — | | 7.7 | | 15 | |
| Rheology | 80F | 180F | 80F | 180F | 80F | 180F | 80F | 180F |
| 3 | 8.5 | 13 | 11 | 17 | 17 | 13 | 16 | 15 |
| 6 | 11.5 | 17 | 13 | 19 | 22.5 | 18.5 | 20.5 | 18 |
| 30 | 27 | 33.5 | 20 | 23 | 48 | 43.5 | 35.5 | 32 |
| 60 | 40 | 46 | 27 | 29 | 71 | 62.5 | 47.5 | 39.5 |
| 100 | 52 | 60 | 34 | 38 | 97.5 | 83 | 59 | 51.5 |
| 200 | 85.6 | 90 | 51 | 57 | 155 | 129 | 85 | 69 |
| 300 | 113 | 115 | 64 | 70 | 204 | 165 | 106 | 85 |
| 600 | 194 | 176 | 107 | 104 | 300+ | 259 | 164 | 117 |
| 325 mesh (without doubling) | 39 ml in 30 min | | 49 ml in 5 min | | 35 ml in 30 min | | 87 ml in 30 min | |
| 60 mesh (without doubling) | No control (142 ml in 1 min) | | 56 ml in 5 min | | 58 ml in 30 min | | 90 ml in 30 min | |
| 500 micron slot on PPA | No control | | 44 ml in 30 min | | 18 ml in 30 min | | 11 ml in 30 in | |

In reference to the 325-mesh and 60-mesh values disclosed in Table 1, fluid loss calculations utilizing API procedures indicate 2×ml of fluid collected within a 30-minute timeframe (doubling the amount of fluid collected). However, for the above referenced experiments, the values reported are the actual number of ml(s) of fluid collected, wherein the number of ml(s) of fluid was not doubled. The actual number of ml of fluid was reported herein because there is no API procedure for 60 mesh. Hence, the values were not doubled for the purpose of depicting an equal comparison of experimental data.

Experiment 1 represents the control group. The control composition included Class H cement, FLCA-2, and a suspending agent. The FLCA-2 was 2-acrylamido-2-methylpropane sulfonic acid. The suspending agent was diutan. The density of the cement slurry of the control group was 15 lb/gal (1797 kg/m$^3$). Rheology and fluid loss control tests resulted in a fluid loss of 39 ml in 30 minutes with the 325-mesh (45-micron) screen; 142 ml in 1 min with the 60-mesh screen, which is equivalent to no control; and no control with the 500-micron slot.

In Experiment 2, the composition included Class H cement, a suspending agent, and an LCM. The LCM was a composition of petroleum coke, calcium carbonate, graphite, and walnut hulls. The PSD of the LCM was D10:3 microns, D50: 65 microns, and D90: 560 microns. The suspending agent was diutan. The density of the cement slurry of Experiment 2 was 15 lb/gal (1797 kg/m$^3$). Rheology and fluid loss control tests resulted in a fluid loss of 49 ml in 5 minutes with the 325-mesh (45-micron) screen; 56 ml in 5 minutes with the 60-mesh (250-micron) screen; and 44 ml in 30 minutes with the 500-micron slot.

The composition in Experiment 3 included Class H cement; FLCA-1; FLCA-2; a suspending agent; an LCM; and clay. FLCA-1 was a polyacryloylmorpholine-based polymer. FLCA-2 was 2-acrylamido-2methylpropane sulfonic acid and an acrylamide-based graft polymer. The suspending agent was a diutan. The LCM was a composition of petroleum coke, calcium carbonate, graphite, and walnut hulls. We The density of the cement slurry of Experiment 3 was 15 lb/gal (1797 kg/m$^3$). The resulting experimental values of Experiment 3 included a fluid loss of 35 ml in 30 minutes with the 325-mesh (45-micron) screen; 58 ml in 30 minutes with the 60-mesh (250 micron) screen; and 18 ml in 30 minutes with the 500-micron slot.

The composition in Experiment 4 included Class H cement; FLCA-1; a suspending agent; an LCM; and clay. FLCA-1 was a polyacryloylmorpholine-based polymer. The suspending agent was diutan. The LCM was a composition of petroleum coke, calcium carbonate, graphite, and walnut hulls. The PSD of the LCM was D10:3 microns, D50: 65 microns, and D90: 560 microns. The density in Experiment 4 was decreased to 13 lb/gal (1558 kg/m$^3$). The experimental results were a fluid loss of 87 ml in 30 minutes with the 325-mesh (45-micron) screen; 90 ml in 30 minutes for the 60-mesh (250-micron 0 screen and 11 ml in 30 minutes for the 500-micron slot.

Therefore, as depicted in the experimental results combining fluid loss additives and LCMs result in improved fluid loss values. For example, Experiments 3 and 4 with fluid loss additives used in combination with the LCMs provided improved results as compared to Experiments 1 and 2 that used fluid loss additives and LCMs separately. For example, Experiment 1 with only FLCA-1 did not have any control on the 60-mesh screen. By way of further example, Experiment 2 with only LCM did not have any control on the 325-mesh screen. However, Experiments 3 and 4 with both an FLCA and LCMs provided control on both the 60-mesh and 325-mesh screen. Moreover, based on the experimental results, adding additional fluid loss additive may result in greater results for fluid loss values. For example, Experiment 3 that further included FLCA-2 with FLCA-1 provided improved control as compared Experiment 4 with only FLCA-1.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of subterranean well cementing comprising:
providing a cement composition comprising a hydraulic cement, a combination of a first fluid loss control additive and a second fluid loss control additive, a lost circulation material, and water,
wherein the first fluid loss control additive is different from the second fluid loss control additive,
wherein the first fluid loss control additive is present in an amount of about 0.05% to about 3% by weight of the cement composition and comprises a water-soluble polymer with repeating units comprising a 5- to 6-membered cyclic amide,
wherein the second fluid loss control additive is present in an amount of about 0.05% to about 3% by weight of the cement composition and comprises a water-soluble polymer comprising at least one unit selected from the group consisting of a dimethyl group, a sulfomethyl group, a sulfonate group, and combinations thereof, and
wherein the lost circulation material has a particle size distribution of from about 2 microns to about 570 microns;
introducing the cement composition into an annular space surrounding a conduit positioned in a subterranean formation, wherein inclusion of the first fluid loss control additive, the second fluid loss control additive, and the lost circulation material in the cement composition reduces fluid loss into the subterranean formation, wherein the subterranean formation has fractures with a width of from about 1 micron to about 800 microns, and wherein the subterranean formation has a permeability of about 1 milliDarcy to about 250 Darcy; and
allowing the cement composition to set in the annular space.

2. The method of claim 1, wherein the water-soluble polymer of the first fluid loss control additive comprises a polyvinylpyrrolidone polymer.

3. The method of claim 1, wherein the water-soluble polymer of the first fluid loss control additive comprises a polyvinylpyrrolidone copolymer selected from the group consisting of an acrylic acid and vinylpyrrolidone copolymer, a methacrylic acid and vinylpyrrolidone copolymer, an acrylamide and vinylpyrrolidone copolymer, an N—N-dimethyl acrylamide and vinylpyrrolidone copolymer, and combinations thereof.

4. The method of claim 1, wherein the second fluid loss control additive is selected from the group consisting of polyacrylamide, an acrylamide copolymer, a copolymer of 2-acrylamido-2methylpropane sulfonic acid and dimethylacrylamide, acrylamide and 2-acrylamido-2methylpropane sulfonic acid monomers grafted on lignite, acryloylmorpholine and vinylphosphonic acid copolymers, and combinations thereof.

5. The method of claim 1, wherein the lost circulation material has a particle size distribution of from about 30 microns to about 400 microns.

6. The method of claim 1, wherein the lost circulation material comprises petroleum coke, calcium carbonate, graphite, and walnut.

7. The method of claim 1, wherein the cement composition has a density of about 479 kg/m$^3$ to about 2396 kg/m$^3$.

8. The method of claim 1, wherein the cement composition has a density of about 839 kg/m$^3$ to about 1917 kg/m$^3$.

9. The method of claim 1, wherein the cement composition has a density of about 1198 kg/m$^3$ to about 1558 kg/m$^3$.

10. The method of claim 1, wherein the cement composition further comprises a lightweight additive selected from the group consisting of sodium silicate, hollow microspheres, gilsonite, perlite, and combinations thereof.

11. The method of claim 10, wherein the lightweight additive is present in an amount of about 0.1% to about 15% by weight of the cement composition.

12. The method of claim 1, wherein the cement composition is a foamed cement composition.

13. The method of claim 12, wherein the foamed cement composition has a density of about 479 kg/m$^3$ to about 1558 kg/m$^3$.

14. The method of claim 1, wherein the subterranean formation has a permeability of about 1 milliDarcy to about 50 Darcy.

15. A cement composition comprising:
a hydraulic cement;
a first fluid loss control additive comprising a water-soluble polymer with repeating units comprising a polyacryloylmorpholine polymer;
a second fluid loss control additive comprising a water-soluble polymer comprising at least one repeating unit selected from the group consisting of a dimethyl group, a sulfomethyl group, a sulfonate group, and combinations thereof; and a lost circulation material having a particle size distribution of from about 2 microns to about 570 microns, wherein the lost circulation material has a particle size distribution of D10: 3 microns, D50: 65 microns, and D90: 560 microns; and water.

16. The cement composition of claim 15, wherein the hydraulic cement is selected from the group consisting of a Portland cement, a pozzolana cement, a gypsum cement, an alumina-based cement, a silica cements, and combinations thereof.

17. The cement composition of claim 15, wherein the water-soluble polymer of the first fluid loss control additive comprises a polyvinylpyrrolidone copolymer selected from the group consisting of an acrylic acid and vinylpyrrolidone copolymer, a methacrylic acid and vinylpyrrolidone copolymer, an acrylamide and vinylpyrrolidone copolymer, an N—N-dimethyl acrylamide and vinylpyrrolidone copolymer, and combinations thereof.

18. The cement composition of claim 15, further comprising a lightweight additive selected from the group consisting of sodium silicate, hollow microspheres, gilsonite, perlite, and combinations thereof.

\* \* \* \* \*